Oct. 10, 1939. J. JIRANEK 2,175,896
REAR-VIEW MIRROR FOR EYEGLASSES
Filed Jan. 12, 1938
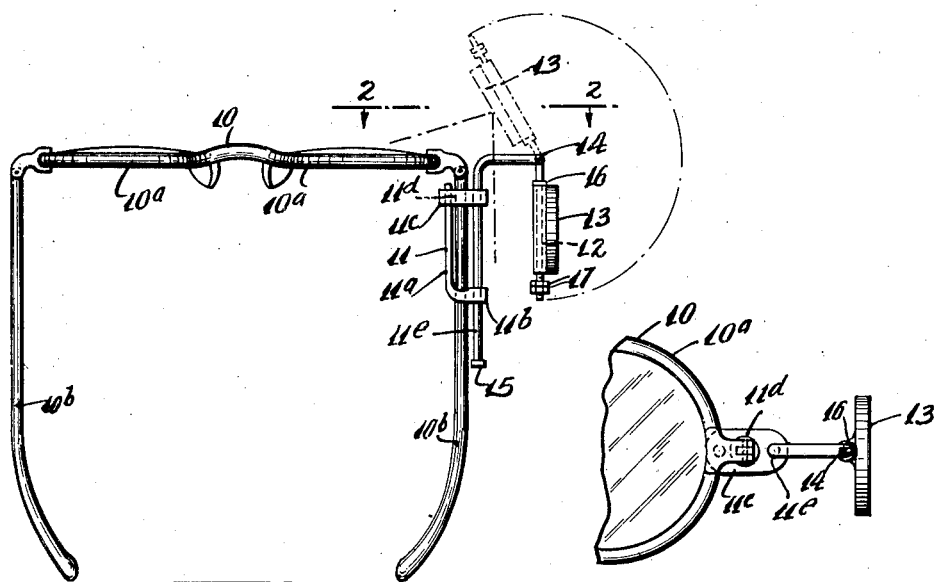
Fig. 1.
Fig. 2.
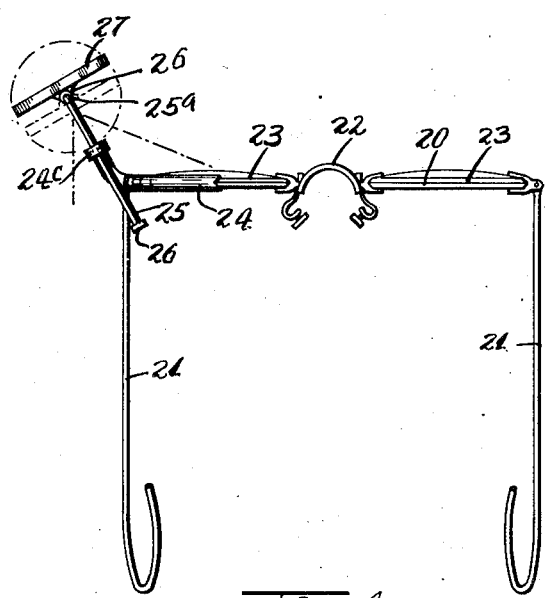
Fig. 4.
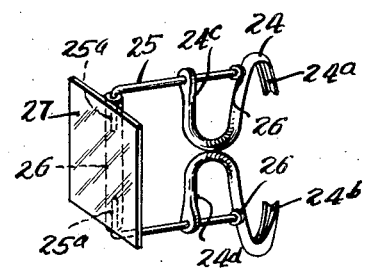
Fig. 3.
INVENTOR
Josef Jiranek
BY
ATTORNEY Patented Oct. 10, 1939

2,175,896

UNITED STATES PATENT OFFICE 2,175,896

REAR-VIEW MIRROR FOR EYEGLASSES

Josef Jiranek, Greenwood Lake, N. Y.

Application January 12, 1938, Serial No. 184,567

1 Claim. (Cl. 88—41)

This invention relates to optical devices, and in particular to optical devices for personal wear, such as eyeglasses and goggles.

The invention has for an object to provide an improved device for personal wear which will extend the visual field in one or more directions.

An optical device according to this invention comprises essentially a small mirror and means for supporting it slightly in advance of the eye and displaced from the center of the latter.

A device according to this invention may be self-supporting or alternatively, it may be adapted to be supported by existing optical devices such as a pair of eyeglasses or a pair of goggles; or again, it may be built into eyeglasses or goggles, eyeshades or the like, so as to form an integral part thereof, in which latter event the mirror itself may be detachable.

As applied to goggles, such as those worn by motorists, in which a pair of glasses have extending rearwardly from their frames, flexible or other bars or walls which fit closely to the face of a wearer, a mirror according to the invention, may be mounted in a separately formed member on the side wall which is hinged at its forward edge, this member of the side wall having the mirror at its inner surface and being capable of opening and shutting after the manner of a door or flap, to and from position for use.

For application to existing eyeglasses a device according to the invention may take a wide variety of forms. For example, it may comprise a stem or framework adapted to be clipped, or otherwise removably engaged with the forward part of a side piece so that the mirror is supported preferably slightly in advance of the junction between said side pieces and the eye rim. Again, the mirror may be supported by a pair of rims adapted the one to extend above and the other below the lens or glass at one side of a pair of eyeglasses and to engage the eye rims to hold the mirror in the appropriate position. In another arrangement, a bar adapted to extend across the eye rims of a pair of spectacles at the top thereof and to be detachably engaged therewith, as by means of spring clips or the like, may carry a mirror at either end thereof. Yet again, a mirror may be supported by clips or equivalent, engageable directly with the eye rim of a pair of glasses.

In the case of a stem or frame which engages the side piece of a spectacle frame, this may have two C shaped clips which can be slipped over the thin part of the side piece and then slipped forwardly thereof tightly to engage the usual thickened or thicker part thereof.

In all cases, the mounting of the mirror may be such as to engage the angular position thereof and distance in relation to the eye or eyes of a wearer to be adjusted, and it is to be understood that the mirror employed need not necessarily be flat but may, with a view to increasing the field of vision made available thereby, be of convex type.

It will be apparent that the present invention enables inconspicuous means to be provided whereby the user or wearer may considerably extend his field of vision, which, although perhaps most useful for seeing in a rearward direction, may nevertheless be used also for extending the field upwardly or downwardly. It will also be apparent that a single optical device according to the invention, may serve for expansion of the field of vision in more than one direction simultaneously. The mirror employed may be of any desired or convenient shape.

For seeing in a rearward direction the invention is particularly useful for cyclists and other road users who cannot conveniently use the rear observation mirror universally employed. The invention is also useful for pilots of aircrafts or for those engaged at lookout stations.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a plan view of a pair of glasses with a mirror device constructed according to this invention applied thereto.

Fig. 2 is an elevational view looking in the direction of the line 2—2 of Fig. 1.

Fig. 3 is a perspective view of another mirror device constructed according to a modification of the invention.

Fig. 4 is a plan view showing the application of the device illustrated in Fig. 3 upon eyeglass frames or eyeglasses.

The mirror device, according to this invention, includes a support for engagement on one's head such as an eyeglass device or a spectacle frame 10. A clamp 11 is provided for engagement on the support 10. An arm 12 is adjustably mounted on the clamp 11. A mirror 13 is pivotally mounted on the arm 12.

The support 10 as shown in Fig. 1 comprises lenses 10$^a$ or goggle frames, and ear bars 10$^b$ connected therewith. The clamp 11 is shown mounted upon one of the ear bars. The clamp 11 comprises an arm 11$^a$ extending parallel to the ear bar 10$^b$ and having an offset end 11$^b$ formed with an opening through which the ear bar extends. The arm 11$^a$ is supported by a bar 11$^c$ which is formed with an opening 11$^d$ through which the ear bar 10$^b$ extends. An L-shaped bar 11$^e$ slidably engages through the end portion 11$^b$ and one end of the bar 11$^c$. The bar 11$^e$ is parallel to the eyeglass bar 10$^b$ and has an offset end. The arm 12 is pivotally supported by a pintle 14 upon the offset of the bar 11$^e$. The arrangement is such that the clamp 11 may be shifted forwards or rearwards along the ear bar 10$^b$ to a satisfactory position. The bar 11$^e$ may also be extended forward and rearwards. At its free end it is provided with a head 15 which limits it from possible complete disengagement from the clamp. The mirror 13 is pivotal upon the arm 12 and is limited from moving in one direction by a clamp 16 on the arm 12. At the other end the mirror 13 is held by lock nuts 17.

The mirror device shown in Figs. 1 and 2 may be moved to an inoperative position, the position shown by the full lines. When it is required that it be used the bar 11$^e$ may be moved forwards and the arm 12 pivoted around to any angular position. Similarly, the mirror 13 may be swivelled on the arm 12. In this manner it is possible to universally adjust the mirror 13 to see directly to the rear or off at an angle, or upwards or downwards, or in other directions as required.

Friction is depended upon to maintain the bar 11$^e$ in forward or rearward position; also to maintain the arm 12 in various pivoted positions, and also to maintain the mirror 13 swivelled to various angular positions.

In Figs. 3 and 4, another modification of the invention has been disclosed which distinguishes from the prior form in the matter of form rather than principle. According to this form of the invention there is a support 20 for engagement on one's head. This support may be a pair of eyeglasses or may be an eyeglass frame or other type of frame adapted to be supported on the head. This support 20 is shown to have ear bars 21 by which it is supported over the ears and across one's face. The support 20 also has a nose support element 22 and glass or frame parts 23 through which a wearer may look.

A clamp 24 is provided for engagement on the support 20. This clamp has a pair of spring jaws 24$^a$ and 24$^b$ which are adapted to clamp upon the edges of the glass or frame portions 23. The clamp is also provided with a front pair of outwardly projecting portions 24$^c$ and 24$^d$. In these latter portions there are arms 25 slidably mounted. Each of these arms has a head 26 to hold it against possible complete displacement. The other ends of the arms have end portions 25$^a$ which are bent towards each other. These end portions 25$^a$ engage into the ends of a tubular support 26 secured upon the back of a mirror 27. The arms 25 are arranged at an angle to the clamp jaws 24$^a$ and 24$^b$, as clearly shown in Fig. 4. The arrangement is such that a wearer may look out into the mirror 27 and see objects to the rear or the sides. The mirror 27 may be pivoted on the end portions 25$^a$. The arms 25 may be extended or retracted, as required. The mirror 27 may be removed by flexing outwards the end portions 25$^a$ to disengage from the ends of the tubular support 26.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A mirror device comprising a support in the form of an eyeglass frame for engagement on one's head, a clamp having a pair of forwardly and outwardly projecting portions with bearings in the ends thereof, said clamp being attachable on said support, a pair of forwardly and outwardly extending arms slidably supported for adjustment in said bearings and bent toward one another at one end, and a mirror pivotally mounted at the ends of said arms, the opposite end portions of said arms being bent toward one another to cooperate with co-acting means on the rear of said mirror for securing said mirror pivotally therebetween, said clamp comprising a pair of clamp jaws adapted to engage the edge of said eyeglass frame.

JOSEF JIRANEK.